May 1, 1951 F. M. FLOURNOY 2,550,988
INTERMITTENTLY ILLUMINATED FISHING LURE
Filed Sept. 10, 1948
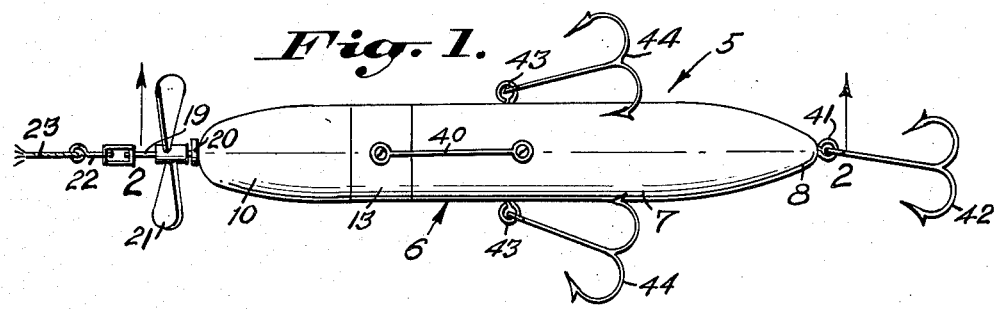
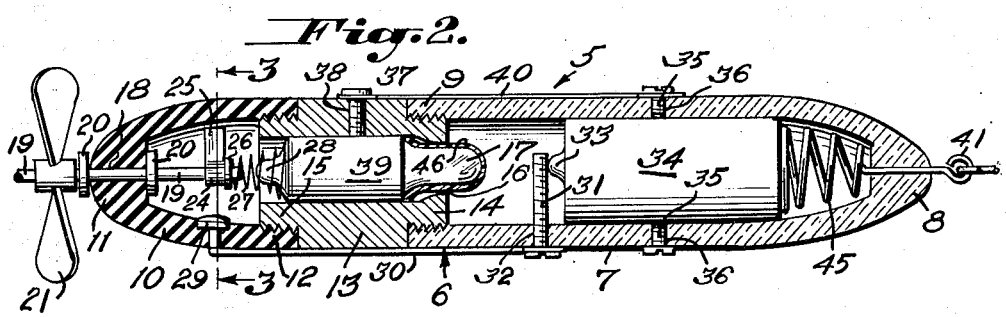
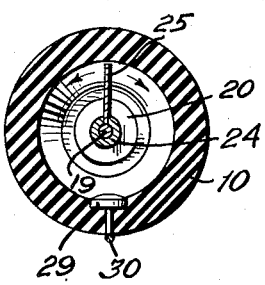
Inventor
Fred M. Flournoy
By John N. Randolph
Attorney Patented May 1, 1951

2,550,988

UNITED STATES PATENT OFFICE 2,550,988

INTERMITTENTLY ILLUMINATED FISHING LURE

Fred M. Flournoy, Wilsonville, Ala.

Application September 10, 1948, Serial No. 48,557

3 Claims. (Cl. 43—17.6)

This invention relates to a fishing lure of extremely simple construction and which will be intermittently illuminated as it is drawn through the water to cause a flashing illumination of a transparent or translucent part of the lure for attracting fish thereto.

More particularly, it is a primary object of the present invention to provide a lure provided with a positive means for causing an intermittent illumination thereof by a self-contained light source disposed within the lure whenever the lure is being propelled through the water.

Still another object of the invention is to provide a lure of extremely simple construction capable of being economically manufactured and sold and which may be readily assembled or disassembled for removing and replacing parts of the self-contained illuminating means thereof and which readily adapts itself to a wide variety of illuminated arrangements adapted for simulating various bait fish and for attracting different species of game fish thereto.

Numerous other objects and advantages of the invention will hereinafter become more fully apparent from the following description of the drawing, illustrating a presently preferred embodiment thereof, and wherein:

Figure 1 is a plan view of the artificial lure in its entirety;

Figure 2 is an enlarged longitudinal sectional view thereof taken substantially along a plane as indicated by the line 2—2 of Figure 1, and Figure 3 is a cross sectional view of the lure taken substantially along a plane as indicated by the line 3—3 of Figure 2.

Referring more specifically to the drawing, the novel artificial flashing lure in its entirety is designated generally 5 and includes a hollow body, designated generally 6 of substantially circular cross section and which is preferably tapered adjacent each end thereof.

The body 6 includes a trailing or tail section 7 of a length preferably in excess of one-half of the total length of the body 6 and which is formed of a suitable transparent or translucent material such as Plexiglas having a tapered closed end 8 forming the trailing end of the lure body 6 and an open, internally threaded forward end 9. The lure body 6 is provided with a forward end section 10 formed of an electrical insulating material such as hard rubber or Bakelite and which is preferably painted black and has a tapered closed forward end 11 constituting the nose or leading end of the lure body 6 and an open internally threaded rear end 12. The lure body 6 also includes an intermediate sleeve portion 13 of greater thickness than the end sections 7 and 10 but of substantially the same external diameter and which is provided with restricted externally threaded ends 14 and 15 to threadedly engage in the threaded ends 9 and 12 of the lure body sections 7 and 10. The body portion 13 is preferably formed of aluminum and the restricted bore 16 thereof is adapted to removably contain a "pen" type flashlight bulb 17 the globe of which faces toward the body portion 7.

The nose portion 11 is provided with a bore 18 extending axially therethrough in which is journaled an intermediate portion of a shaft 19 having collars 20 thereon bearing against the inner and outer sides of the nose 11 to prevent longitudinal movement of the shaft 19 relatively to the body 6. A propeller 21 is fixed to the shaft 19 forwardly and adjacent the nose 11 and a swivel 22 is connected to the forward end of the shaft 19 in advance of the propeller 21 and is adapted to be connected at its forward end to a fishing line 23. As seen in Figure 2, the shaft 19 extends rearwardly within the body portion 10 to adjacent the body section 13 and has a sleeve 24 fixed thereto and in which is suitably anchored one end of a resilient metal strip 25 which projects radially therefrom to a point adjacent the inner wall of the body section 10, as best illustrated in Figure 3. Rearwardly of the sleeve 24 and spaced from the rear end of the shaft 19, a collar 26 is secured to said shaft to form an abutment for one end of an expansion coil spring 27 which engages on the rear end of the shaft 19 and which extends rearwardly therefrom and has its opposite end engaging the positive terminal 28 of the bulb 17.

An electrical contact 29 is embedded in the body section 10 and extends into the cavity thereof and is disposed in transverse alignment with the resilient strip 25 which, like the sleeve 24, shaft 19 and collar 26 is formed of an electrical conducting material. A strip of electrical conducting material connects with the contact 29 and said strip 30 extends outwardly of the body section 10 and rearwardly along the body 6 and is connected at its opposite end to a screw 31 of electrical conducting material which extends radially inwardly through a threaded opening 32 in the body section 7 and which is removably disposed therein. The screw 31 is of a length greater than the diameter of the body 6 and the inner end thereof is adapted to engage the positive contact 33 of a dry cell battery 34 which is disposed in the body section 7 rearwardly of said screw 31 and which is retained therein by the screw 31 and by removable setscrews 35 which engage threaded openings 36 of the body section 7 and which are adapted to have their inner ends bearing against the cylindrical wall of the battery 34 to retain said battery against sliding movement when the setscrews 35 are in advanced positions.

The bulb 17 is detachably retained against sliding movement in the bore 16 by a setscrew 37 which extends inwardly of the body section 13 through a threaded opening 38 and the inner end of which engages the side wall or negative contact portion 39 of the bulb 17. A conductor strip of electrical conducting material, designated 40, extends between the screw 37 and one of the screws 35, which screws are of electrical conducting material, for forming an electrical connection between the negative contact 39 of the bulb 17 and the ground or negative of the battery 34, provided by the side wall thereof.

An eye 41 is anchored in and projects rearwardly from the tail or trailing end 8 of the body section 7 and is engaged by the eye at the shank end of a multiple barbed hook 42. The body section 7 also has an eye 43 projecting outwardly from each side thereof, substatially intermediate of the ends of the body 6 and to each of which eyes 43 is similarly connected a multiple barbed hook 44.

An expansion coil spring 45 may be disposed between the rear end 8 of the body and the adjacent end of the battery 34 to yieldably retain the contact 33 in engagement with the conductor screw 31 and to insure that the battery will be so positioned when the setscrews 35 are advanced.

From the foregoing it will be readily apparent that as the lure 5 is drawn through the water in a direction from right to left of Figures 1 and 2 in being trolled or retrieved by the fishing line 23, the propeller 21 by engagement with the water will be caused to revolve and function as an impeller for revolving the shaft 19 and spring conducting strip 25. At each revolution of the spring conducting strip 25, its outer end will move into and out of contact with the contact 29 and while in engagement therewith will complete the circuit between the electric source or battery 34 and the lamp bulb 17 for energizing said lamp bulb to illuminate the body portion 7 to thereby cause the body portion 7 to be intermittently illuminated so as to cause a flashing light to be emitted therefrom. The current from the battery 34 will flow through the parts 33, 31, 30, 29, 25, 24, 19 and 27 to the positive contact 28 of the bulb 17 and from its negative contact 39 through the parts 38, 40 and 36 back to the negative side of the battery 34.

If desired, the globe of the bulb 17 may be covered with one or more sheets of various colored cellophane or the like as indicated at 46 for coloring the light rays emitted from the bulb for thereby similarly coloring the transparent or translucent body section 7 when the bulb is illuminated and/or said body section 7 may be suitably marked to simulate various species of bait fish, when illuminated.

The metal parts of the lure 5 are preferably formed of bronze and the electrical conductor parts of copper or other material not adversely affected by salt water.

Various modifications and changes are contemplated and may obviously be resorted to, without departing from the spirit or scope of the invention as hereinafter defined by the appended claims.

I claim as my invention:

1. An illuminated fishing lure comprising an enclosed body portion including a translucent portion, a self contained light source disposed within the lure body for illuminating said translucent portion including a lamp bulb and battery and conductors electrically connecting the contacts of the lamp bulb and battery, a make and break switch for energizing and deenergizing said light source interposed in and forming a part of one of the conductors including a rotatable switch element, and rotatable actuating means adapted to be actuated by movement of the lure body through the water for actuating the switch for intermittently energizing and deenergizing the light source including a shaft fixed to the rotatable switch element and journaled in the body portion and an impeller fixed to the shaft and disposed externally of the body portion and rotated by impingement of the water against the impeller.

2. A lure as in claim 1, said switch including a fixed contact disposed in the lure body, said rotatable switch element being mounted in the lure body and movable into and out of engagement with the fixed contact when revolved with the shaft.

3. An artificial trolling or retrieving lure comprising a hollow lure body provided with a transparent portion, a light source detachably contained therein including a lamp bulb and battery for illuminating the transparent body portion when said light source is energized, a make and break switch disposed within said lure body including a movable switch element and a fixed switch element, interposed in the circuit of the lamp bulb and battery, a first conductor connected to one contact of the battery and to one contact of the lamp bulb, a second conductor connected to the other battery contact and having one end constituting the fixed switch element, said movable switch element being electrically connected to the other lamp bulb contact, a shaft journaled in the lure body and having one end projecting therefrom, said movable switch contact being secured to said shaft for rotation therewith for movement into and out of engagement with the fixed contact for energizing and deenergizing, respectively, the lamp bulb, and a propeller fixed to the shaft and disposed externally of the lure body for rotation by movement of the lure body through the water for revolving said shaft and movable switch contact.

FRED M. FLOURNOY.

REFERENCES CITED

The following references are of record in the file of this patent:

UNITED STATES PATENTS

| Number | Name | Date |
| --- | --- | --- |
| 1,344,084 | Hackett | June 22, 1920 |
| 1,875,563 | Cooke et al. | Sept. 6, 1932 |
| 2,002,135 | Barton | May 21, 1935 |
| 2,197,372 | Bailey | Apr. 16, 1940 |
| 2,217,565 | Seigle et al. | Oct. 8, 1940 |
| 2,500,442 | Waite | Mar. 14, 1950 |

FOREIGN PATENTS

| Number | Country | Date |
| --- | --- | --- |
| 612,106 | France | 1926 |